US009373254B1

(12) United States Patent
Metrani et al.

(10) Patent No.: US 9,373,254 B1
(45) Date of Patent: Jun. 21, 2016

(54) INFRARED COMMUNICATIONS ON A MOBILE DEVICE

(71) Applicant: Peel Technologies, Inc., Mountain View, CA (US)

(72) Inventors: Samyeer Suresh Metrani, Milpitas, CA (US); Siva Subramanian Muthukumarasamy, Santa Clara, CA (US)

(73) Assignee: Peel Technologies, Inc., Mountain View, CA (US)

( * ) Notice: Subject to any disclaimer, the term of this patent is extended or adjusted under 35 U.S.C. 154(b) by 0 days.

(21) Appl. No.: 14/634,566

(22) Filed: Feb. 27, 2015

(51) Int. Cl.
*H04B 10/114* (2013.01)
*G08C 23/04* (2006.01)

(52) U.S. Cl.
CPC .................................... *G08C 23/04* (2013.01)

(58) Field of Classification Search
CPC ............ H04B 10/114; H04B 10/1143; H04B 10/1149; G08C 23/04
USPC ................................................ 398/106, 107
See application file for complete search history.

(56) References Cited

U.S. PATENT DOCUMENTS 6,384,737 B1 5/2002 Hsu et al.
7,394,987 B2 * 7/2008 Hong ................ H04B 10/1149 398/106
7,796,889 B1 9/2010 Rourke
8,027,592 B2 9/2011 Fugaro et al.
8,712,245 B1 4/2014 Alao et al.
8,989,583 B1 3/2015 Metrani et al.
2007/0110447 A1 5/2007 Hong et al.
2013/0171981 A1 * 7/2013 Woo ...................... G08C 17/02 455/420
2013/0272714 A1 * 10/2013 Ohkubo ................ G08C 23/04 398/106
2015/0125154 A1 * 5/2015 Chun .................... G08C 23/04 398/106

OTHER PUBLICATIONS

PCT International Search Report and Written Opinion, PCT Application No. PCT/US16/19496, Apr. 1, 2016, 12 pages.

* cited by examiner

*Primary Examiner* — Dalzid Singh
(74) *Attorney, Agent, or Firm* — Fenwick & West LLP

(57) ABSTRACT

A system and a method are disclosed for compensating for discontinuous clock signals, default-high data buses, when generating and receiving an infrared signal on a mobile device with minimal hardware. The system can compensate for clock signals that are discontinuous using an effective bitrate in place of a nominal bitrate when processing signals. The effective bitrate can be determined by determining the length of a break in the clock signal that is discontinuous and adjusting the nominal bitrate based on the length and recurrence frequency of the break in the clock signal. Additionally, processed signals transferred on default-high data buses can be inverted to ensure the correct IR signal is output or received.

30 Claims, 10 Drawing Sheets

INFRARED COMMUNICATIONS ON A MOBILE DEVICE

BACKGROUND

1. Field of Art

The disclosure generally relates to the field of infrared communication and more specifically to generating and receiving infrared signals on a computing device.

2. Description of the Related Art

Conventional remote-controlled electronics, such as stereos, televisions, set-top boxes, and DVD players, send and receive information using infrared signals. Typically, a user sends an infrared signal to an external device from a remote control specifically paired with the external device. For example, a television may receive instructions from a remote control designed for use with that particular television. However, users can now control multiple devices using a single mobile device (e.g., a smartphone or tablet) that acts as a remote control. Current mobile devices require specialized hardware to communicate with remote-controlled devices. However, additional hardware increases the cost of manufacturing mobile devices and increases power consumption within mobile devices.

BRIEF DESCRIPTION OF DRAWINGS

The disclosed embodiments have other advantages and features which will be more readily apparent from the detailed description, the appended claims, and the accompanying figures. A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Basic Configuration Overview

A computing device can generate and receive an infrared (IR) signal by decoupling data sent or received on a data bus from its operating frequency. This can effectively move the signal on the data bus from the frequency domain to the time domain. To generate an IR signal, the computing device receives a raw IR code that encodes information to be output as an IR signal and determines an intended frequency of the output signal. Based on the IR code and the intended output signal frequency, the computing device generates a processed signal in the form of a bitstream that encodes the information in the raw IR code in the time domain. In one embodiment, the processed signal may be modulated to comply with requirements from the receiving device. In another embodiment, the processed signal may additionally or alternatively be upsampled to avoid compressing the IR signal in the time domain. To receive an IR signal, the computing device samples the received signal to convert it to an intermediate signal that takes the form of a bitstream in the time domain. The intermediate signal can then be trimmed, downsampled, and/or demodulated before being converted into a raw IR code.

In one embodiment, the computing device can compensate for a data bus with a clock signal that is discontinuous by determining the effective bitrate of the data bus. The effective bitrate can be determined by measuring the length and number of clock breaks in a particular period and then determining the actual number of bits output over that period. Alternatively, bits that fall during a clock break can be removed. In another embodiment, the computing device can compensate for a data bus that has a default-high signal instead of a default-low signal by inverting bits before they are sent across the data bus from the processor or inverting bits after they have been received by the processor across the data bus.

Example Computing Machine Architecture

Figure 1:
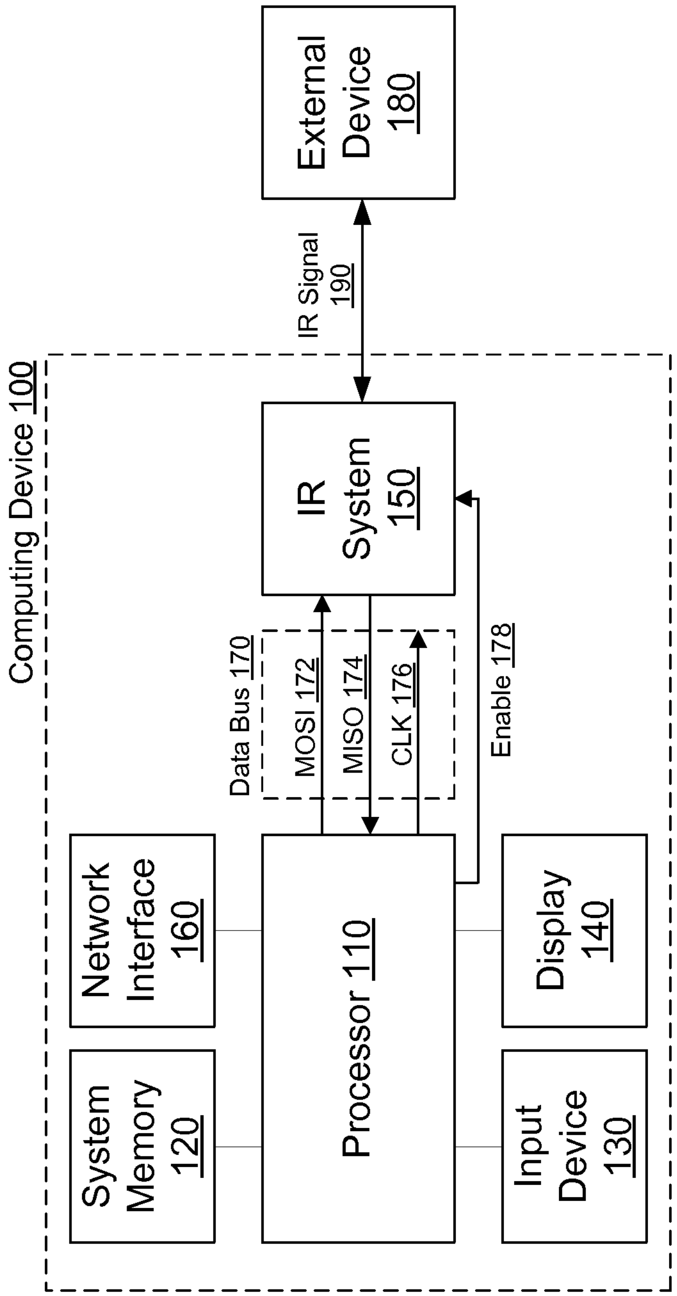
FIG. 1 illustrates a computing device capable of generating an infrared signal, according to one example embodiment.

Turning now to figure (FIG. 1, shown is a block diagram of a computing device 100 capable of generating and receiving an IR signal 190, according to one example embodiment. The computing device 100 may be a personal computer (PC), a tablet, a personal digital assistant (PDA), a smartphone, an electronic device (e.g., a television, a stereo, etc.), or any other machine capable of generating and/or receiving an infrared signal alone or with external hardware. Furthermore, while only a single computing device 100 is illustrated, the term "computing device" shall also be taken to include any collection of devices that individually or jointly perform (e.g., through processing computer program instructions) any one or more of the methodologies discussed herein.

The example computing device 100 includes one or more processor units 110 (e.g., a central processing unit (CPU), a digital signal processor (DSP), one or more application specific integrated circuits (ASICs), or any combination of these) and a system memory 120 (e.g., a hard disk, an optical drive, a solid state drive, or any combination of these). The system memory 120 includes a machine-readable medium storing instructions (e.g., software) or program code embodying any one or more of the methodologies or functions described herein. Furthermore, the system memory 120 may also include volatile memory. The instructions or program code may also reside, at least partially, within the processor unit 110 (e.g., within a processor unit's cache memory) during execution thereof.

While the machine-readable medium is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions or program code for execution by the machine and that cause the machine to perform any one or more of the methodologies disclosed herein. The term "machine-readable medium" includes, but not be limited to, data repositories in the form of solid-state memories, optical media, and magnetic media.

The instructions may be transmitted over a network via a network interface 160 connected to the processor 110. The network interface 160 operatively connects the computing device 100 to one or more networks. For example, the network interface 160 may connect the computing device 100 to a wired or wireless network using technologies such as Ethernet, 802.11, worldwide interoperability for microwave access (WiMAX), 3G, 4G, Long Term Evolution (LTE), code division multiple access (CDMA), digital subscriber line (DSL), etc. Examples of networking protocols used include multiprotocol label switching (MPLS), transmission control protocol/Internet protocol (TCP/IP), hypertext transport protocol (HTTP), simple mail transfer protocol (SMTP), and file transfer protocol (FTP). In some embodiments, some or all of the data is encrypted using any suitable technique or techniques.

In some embodiments, the computing device 100 may further include an input device 130 (e.g., a keyboard, a touchscreen, a keypad, a joystick, etc.) and a display 140 (e.g., a plasma display panel (PDP), a liquid crystal display (LCD), a projector, or a cathode ray tube (CRT)) to receive and output data to a user, respectively. A single component, such as a touchscreen, may be configured as both an input device 130 and a display 140.

The computing device 100 includes an IR system 150, which is made up of a component or set of components capable of generating or receiving an IR signal 190. Based on data sent to the IR system 150 from the processor 110, the IR system 150 can generate an IR signal 190 that encodes information in a series of IR flashes emitted from the IR system 150. Similarly, the IR system 150 can receive an IR signal that consists of data encoded as a series of IR flashes. The IR system 150 includes an IR light-emitting diode (LED) or another component that emits light in the IR or near-IR spectrum, as well as a component that can detect light in the IR or near-IR spectrum, like an IR LED or sensor. The IR system 150 also includes a driver circuit to control the output of the IR LED. The driver circuit, for example, may be a transistor, an integrated circuit, an I/O pin connected to a microprocessor, or any combination of these that controls current to the IR LED. In some embodiments, the IR LED on the IR system 150 is capable of both generating and receiving an IR signal 190. In other embodiments, the IR system 150 may only be capable of generating or receiving an IR signal 190, but not both.

The IR system 150 can be configured to communicate with an external device 180 via IR signals 190. The external device 180 may be an electronic device such as a television, a stereo, a computer, or a home appliance. Examples of a home appliance include a heater, a fan, a thermostat, a garage door, or an air conditioner. The external device 180 can be any other applicable device that receives or sends data via IR signals 190. For example, the external device 180 may be a set-top box, a digital video recorder (DVR), a video player (including but not limited to a Blu-ray player, a DVD player, a VCR player, and the like), a gaming console, a digital media player (including but not limited to an APPLE TV, a ROKU BOX, an AMAZON FIRE, and the like), or a sound system. These example embodiments of an external device 180 may be connected to a television or implemented as standalone devices. Additionally, the IR system 150 may be configured to receive an IR signal 190 generated by one or more external devices 180 or transmit IR signals 190 to one or more external devices 180. For example, the computing device 100 communicates with a television via IR signals 190 to adjust the volume of the television, but may communicate with a set-top box via IR signals 190 to select the channel playing on the television.

A data bus 170 connects the processor 110 to the IR system 150. Though the data bus 170 may be of any model or type that has the characteristics described below, the data bus 170 may specifically be a serial peripheral (SPI) bus or an inter-IC sound ($I^2S$) bus. The processor 110 and the IR system 150 may communicate in a master/slave mode, in which the IR system 150 is slaved to the processor 110 via the data bus 170. Therefore, the data bus 170 connecting the processor 110 and the IR system 150 may include multiple logic signals for linking the two components in a master/slave relationship, including a Master-Out/Slave-In line (MOSI) 172, a Master-In/Slave-Out line (MISO) 174, and a clock (CLK) signal 176. The MOSI line 172 carries data from the processor 110 to the IR system 150, and the MISO line 174 carries data from the IR system 150 to the processor 110. The CLK signal 176 is not connected to the IR system 150, and thus signals at the IR system 150 are not tethered to the clock signal. The CLK signal 176 has a clock speed that reflects the operating frequency of the data bus 170. The clock speed is also the rate at which data is transferred on the data bus 170, which is known as the bitrate of the data bus 170. In some embodiments, the data bus 170 may feature additional or alternative logic signals. Additionally, there may be multiple data buses 170 in some embodiments.

The data bus 170 can have several distinct alternatives. The data bus 170 may also be "default low" or "default high," meaning that the default signal level of the data bus is either low or high. The default signal level of a data bus varies between processor platforms. For a default-low data bus 170, the default signal output of the MOSI line 172 is a logic low or "0." For a default-high data bus 170, the default signal output of the MOSI line 172 is a logic high or "1." Additionally, the clock speed of the data bus 170 may be fixed or adjustable. A fixed clock speed means that the bitrate of the data bus 170 cannot be changed, while an adjustable clock speed means that the bitrate of the data bus 170 can be changed and may be set to a predetermined value or an arbitrary value.

Furthermore, the clock signal of the data bus 170 may be continuous or discontinuous. A continuous clock signal has clock transitions at equally spaced intervals, and the time needed to transfer 12 bits of data is exactly 12 clock periods. A clock signal that is discontinuous has "breaks" between the clock transitions where there is no clock signal, which makes transferring 12 bits of data take longer than 12 clock periods. Thus, a clock signal that is discontinuous can affect signals that are output or input over the data bus 170 in the time domain. When the data output is not tied to the clock signal, a clock signal that is discontinuous lengthens the overall period of the output signal. Similarly, when the data input is not tied to the clock signal, a clock signal that is discontinuous shortens the overall period of the intermediate signal generated by the input.

An enable line 178 can connect the processor 110 and the IR system 150. The enable line 178 can be connected to the IR system 150 in such a way that the IR system 150 only receives or generates signals when the enable line 178 is activated. The enable line 178 can be a GPIO pin, or a chip (or slave) select line on the data bus 170. In some embodiments, the enable line 178 is activated when it carries a logic high signal, while in other embodiments the enable line 178 is activated when it carries a logic low signal.

Example System for Generating and Receiving Infrared Signals

Figure 2:
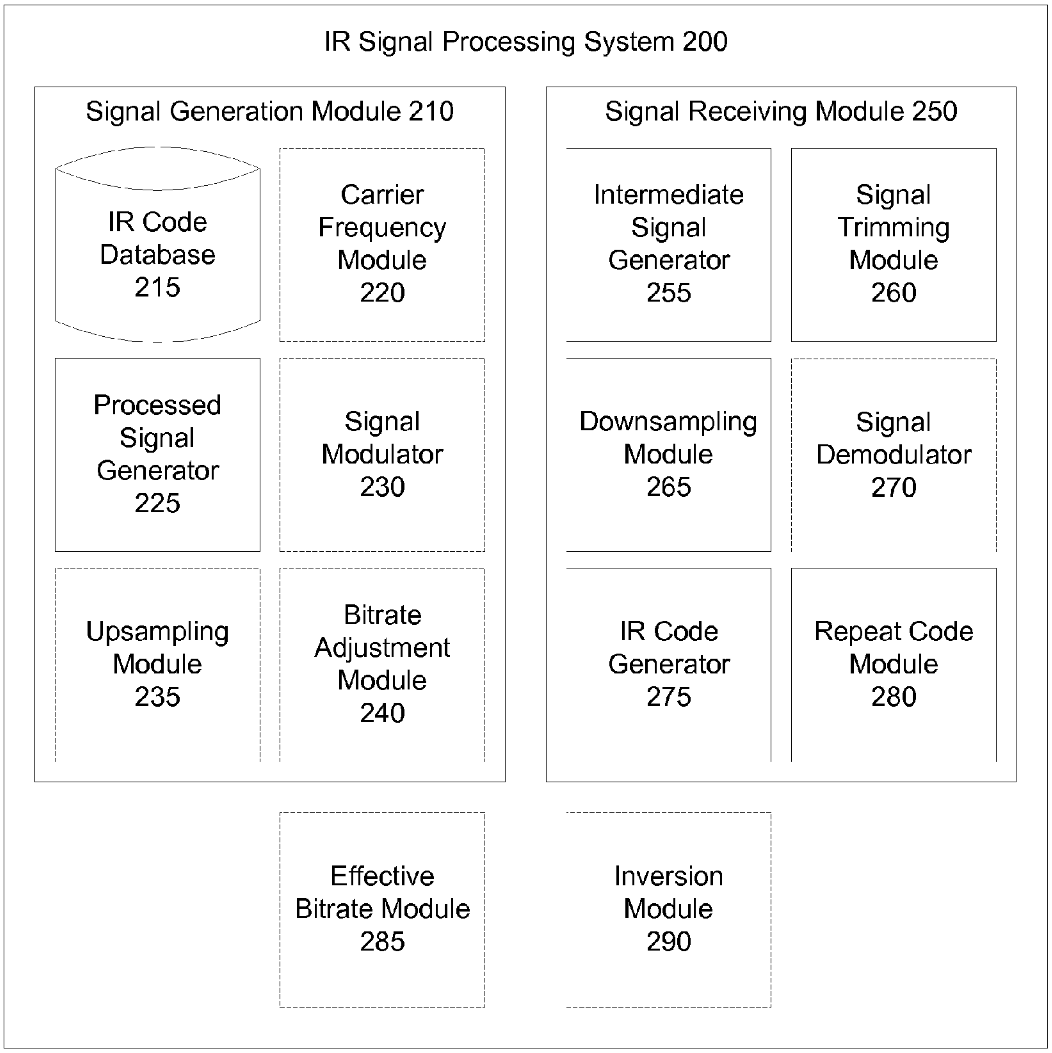
FIG. 2 illustrates a system capable of generating and receiving an infrared signal, according to one example embodiment.

FIG. 2 illustrates an exemplary IR signal processing system 200 that can generate and receive IR signals 190, and is capable of performing the processes and methods described herein. In one embodiment, the described modules are configured as computer code (e.g., instructions) executable by one or more processes. The IR signal processing system 200 is made up of modules, including a signal generation module 210 and a signal receiving module 250. The signal generation module 210 generates the infrared signal 190 from an IR code, and includes all or a subset of an IR code database 215, a processed signal generator 220, a carrier frequency module 225, a signal modulator 235, an upsampling module 240, and a bitrate adjustment module 230. The signal receiving module 250 generates an IR code from a received IR signal, and includes all or a subset of an intermediate signal generator 255, a signal trimming module 260, a downsampling module 265, a signal demodulator 270, an IR code generator 275, and a repeat code module 280. Additionally, the IR signal processing system 200 can contain an effective bitrate module 285 and an inversion module 290.

The IR code database 215 is a database or memory that stores at least one IR code. The IR code database 215 can be a data buffer on the system memory 120 or a cache on the processor 110. The IR code can be a raw IR code in mark/space format. In some embodiments, the IR code database 215 stores many IR codes that are compatible with external devices 180 that the system is known to interact with. In other embodiments, the IR code database 215 is only capable of storing one IR code at a time and a more complete database of IR codes is maintained on at an external location, such as a server connected to a network accessible by the computing device 100.

The carrier frequency module 220 determines a carrier frequency that corresponds to the IR code. The carrier frequency is needed to accurately translate the IR code into a signal in the time domain. The carrier frequency module 220 determines the carrier frequency through analysis of a received carrier waveform. The carrier waveform can be a pulse train at a specific carrier frequency. The analysis can be based on any conventional digital signal processing algorithm. In some embodiments, the signal generation module 210 does not have a carrier frequency module 220 because the carrier frequency is already known.

The processed signal generator 220 uses an IR code and a carrier frequency to generate a processed signal. The IR code can be retrieved from the IR code database 215, while the carrier frequency can be provided by the carrier frequency module 220, or by another source, such as known protocols. The processed signal encodes the data from the IR code and carrier frequency in the form of a bitstream and an intended bitrate, which represents the rate at which the bitstream should be output.

The signal modulator 230 modulates the processed signal so that the processed signal can be output by the IR system 150 as a series of short pulses. The signal generation module 210 may not include a signal modulator 230 if the processed signal does not need to be modulated before being output to the IR system 150.

The upsampling module 235 upsamples the processed signal so that it can be output at a bitrate that is higher than its intended bitrate without compressing the signal in the time domain. The output bitrate may be the bitrate of the data bus 170. The signal generation module 510 may not include an upsampling module if the bitrate of the data bus 170 can be set to the intended bitrate of the processed signal.

The bitrate adjustment module 240 adjusts the bitrate of the data bus 170 to change the rate at which the processed signal is output. In some embodiments, the bitrate of the data bus 170 may be adjusted to the intended bitrate of the processed signal. The signal generation module 210 only includes a bitrate adjustment module 240 if the data bus 170 has an adjustable bitrate.

The intermediate signal generator 255 generates an intermediate signal based on a received IR signal in the signal receiving module 250. The intermediate signal encodes the data of the received IR signal as a bitstream by sampling the IR signal at the bitrate of the data bus 170.

The signal trimming module 260 trims excess bits from the intermediate signal. These excess bits can be leading and trailing bits that do not convey data. The signal trimming module 560 determines which bits are the leading and trailing bits, and subsequently removes them from the intermediate signal.

The downsampling module 265 downsamples the intermediate signal based on the difference between the sampling frequency, which is equal to the bitrate of the data bus 170, and the carrier frequency of the signal. In one embodiment, the carrier frequency is determined by the carrier frequency module 220.

The signal demodulator 270 demodulates the intermediate signal. A signal demodulator 270 may not be included in the signal receiving module 250 if the received IR signal or intermediate signal is not modulated. A signal demodulator 270 may also not be included in the signal receiving module 250 if the IR code is to be generated with modulation taken into account.

The IR code generator 275 converts the intermediate signal into an IR code after the intermediate signal has been downsampled. The IR code may be encoded in a mark/space format and determined in part based on the carrier frequency associated with the intermediate signal.

The repeat code module 280 separates repeated code segments from the IR code using machine learning or a similar algorithm. The repeat code module 280 may further store the repeated code segments.

The effective bitrate module 285 determines the effective bitrate for a data bus 170 with a clock signal that is discontinuous. A clock signal that is discontinuous may be made up of repeating units that have a specific number of equally-spaced clock transitions and then a break, so the breaks occur in a consistent pattern. The effective bitrate can be determined by measuring the number and length of the breaks in the clock signal over an arbitrary period. Alternatively, this can be done by averaging the number of pulses in the clock signal by the overall length of the clock signal, where the portion of the clock signal that is being averaged is sufficiently long enough to include at least several clock breaks. The effective bitrate module 285 is not necessary if the clock signal of the data bus 170 is not discontinuous.

The inversion module 290 accounts for a default-high data bus 170 by inverting signals sent to or from the IR system 150. Thus, the IR system 150 will output a "0" when the intended signal is a "0," even if a "0" is output as a logic high over the data bus 170. Similarly, the computing device 100 will correctly record a "1" if the IR system 150 receives a signal, even if the "1" is embodied as a logic low over the data bus 170. The inversion module 290 is not necessary if the data bus 170 is a default-low data bus 170.

The system may include additional, fewer, or different modules for various applications. Each module may be embodied as a hardware component, software code, or as a combination of both. The system 200 may be embodied as software code stored on the computing device 100, as hardware configured on a computing device 100, or as a server accessible by the computing device 100.

Example Process for Generating an Infrared Signal

Figure 3:
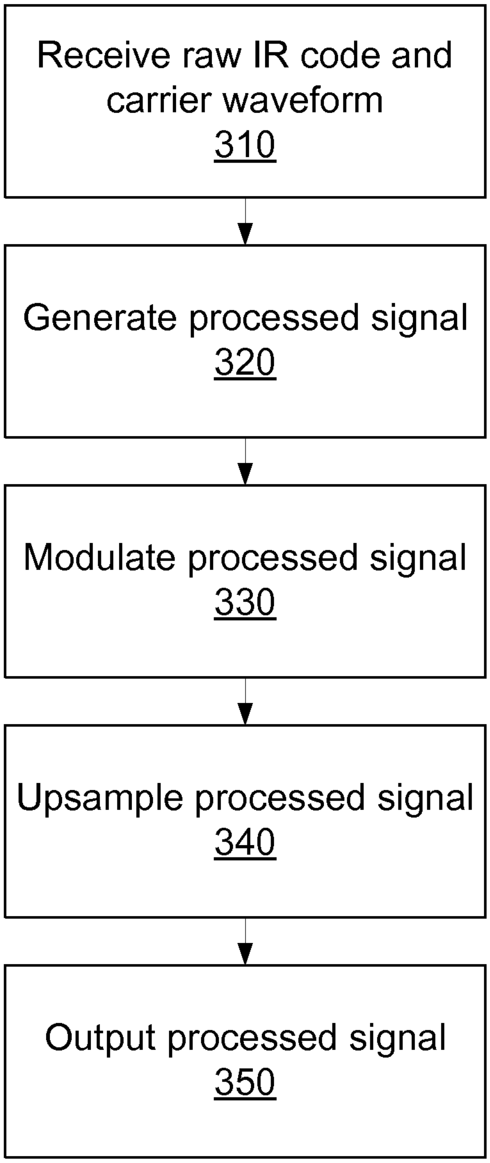
FIG. 3 illustrates a process for generating an infrared signal on a computing device with a fixed clock speed, according to one example embodiment.

FIG. 3 is a flowchart depicting a process for generating an IR signal on a computing device 100 that has a default-low data bus 170 with a fixed clock speed, according to one embodiment. The process of FIG. 3 is enabled at least in part by software executing on the computing device 100. For example, the computing device 100 may include instructions stored to a non-transitory computer-readable storage medium that when executed by the processor 110, cause the processor 110 to perform the steps of FIG. 3 below. Additional or alternative steps may be included in other embodiments of the process of FIG. 3.

The computing device 100 receives 310 an IR code that is stored in the IR code database 215. The IR code may be a raw IR code encoded in mark/space format as a string of numbers. Each number in the raw IR code represents a number of counts during which the IR system 150 is "on" (i.e., emitting an IR signal, logic high, or "1") or "off" (i.e., not emitting an IR signal, logic low, or "0"). In one embodiment, numbers that represent counts during which the IR system 150 is in an ON state (e.g., logic high or logic "1") are located at odd indexes in the raw IR code, while numbers that represent counts during which the IR system 150 is in an OFF state (e.g., logic low or logic "0") are located at even indexes in the raw IR code.

The length of each count is determined from a carrier frequency associated with the IR code. For example, a carrier frequency of 38 kHz has a period of 26.3 microseconds (μs), which defines the duration of the count. In some embodiments, the carrier frequency is determined from a carrier waveform in the carrier frequency module 220. The analysis used to determine the carrier frequency from the carrier waveform can be any conventional digital signal processing algorithm and can be performed by the computing device 100. In other embodiments, the carrier frequency is received by the computing device 100 or is specified by one or more infrared communications protocols, such as Consumer IR (CIR), NEC, RC-5, or other applicable infrared communications protocols. For example, one or more IR communications protocols specify a carrier frequency of 38 kHz, while other communications protocols specify a carrier frequency of 56 kHz.

The computing device 100 generates 320 a processed signal based on the IR code in the processed signal generator 225. The processed signal takes the form of a bitstream, where each bit corresponds to a count of the IR code during which the IR system 150 is in an ON state or an OFF state. For example, each "1" in the bitstream represents a count during which the IR system is in an ON state, while each "0" represents a count during which the IR system is in an OFF state. Additionally, the processed signal has an intended bitrate associated with the bitstream so that the signal can be output properly in the time domain.

For a raw IR code in mark/space format, the processed signal is generated by determining the value and index (i.e., position in the string) of each number in the raw IR code. The computing device 100 generates a plurality of bits for each number of the raw IR code, where the number of bits is determined by the value of the number in the raw IR code. For example, a "5" in the raw IR code is represented in the processed signal as five bits. The value of each bit is determined by the index of the number. For example, each bit in the processed signal representing a number at an odd index in the raw IR code is embodied as a "1." Likewise, each bit in the processed signal representing a number at an even index in the raw IR code is embodied as a "0." In some embodiments, a number at an odd index of the raw IR code is embodied as a "1," and a number at an even index of the IR code is embodied as a "0." Each plurality of bits is inserted into the processed signal at the index of the corresponding number in the raw IR code. The intended bitrate of the processed signal is based on the carrier frequency. For example, a carrier frequency of 38 kHz results in an intended bitrate of 38 kilobits per second.

The computing device 100 modulates 330 the processed signal in the signal modulator 230 by encoding the IR signal as a series of short pulses. Each pulse corresponds to a count that the IR system 150 is ON. With pulse-amplitude modulation, the duration of the pulse may be less than the duration of the count. In some embodiments, this form of modulation is achieved by appending a 0 after each bit in the processed signal. Effectively, each "1" in the processed signal is replaced by "10" and each "0" in the processed signal is replaced by "00." Thus, each pulse is represented by "10" in the modulated processed signal. The computing device 100 then doubles the intended bitrate of the processed signal so that both bits, and thus the entire pulse, are output during one count. This allows the pulses to still be output at the carrier frequency. Since each pulse includes a single "1" (during which the IR system 150 is on) and a single "0" (during which the IR system 150 is off), the duty cycle of the pulse is 50%. The duty cycle may be changed by appending additional bits to each bit in the processed signal. Varying the duty cycle can be useful because different infrared communications protocols may specify different duty cycles.

The computing device 100 does not need to modulate 330 the processed signal in all cases. In one embodiment, the external device 180 may be able to communicate with unmodulated IR signals 190. For example, a television system may be able to communicate using an IR communications protocol in which the output IR signal is unmodulated. Instead, the IR signal 190 may comprise a series of IR pulses of varying lengths instead of a series of IR pulses of uniform lengths. In another exemplary embodiment, the computing device 100 is able to output a modulated signal without modulating 330 the processed signal because the received 610 IR code is already modulated. Thus, the computing device 100 does not need to further modulate the resultant processed signal before outputting it to the IR system 150.

The computing device 100 upsamples 340 the processed signal by the upsampling module 235. If the intended bitrate of the processed signal is lower than the bitrate of the data bus 170, the processed signal will be compressed in the time domain when it is output to the IR system 150 over the data bus 170 at the higher bitrate. This time-domain compression can be avoided by upsampling 340 the processed signal according to the difference between the intended bitrate and the bitrate of the data bus 170. This upsampling effectively alters the processed signal so that the intended bitrate and the bitrate of the data bus 170 match.

The upsampling module 235 appends a number of replicated bits to each bit in the processed signal to create a processed signal that can be output at the bitrate of the data bus 170. The number of replicated bits that is to be appended to each bit in the processed signal is determined such that, when output at the bitrate of the data bus 170, the original bit and the replicated bits are output over the same time interval as the original bit at the intended bitrate. The number of replicated bits is one less than the quotient of the bitrate of the data bus and the intended bitrate. For example, if the intended bitrate of the processed signal, after modulation 330, is 76 kbit/s and the bitrate of the data bus 170 is 1.5 Mbit/s, the computing device 100 determines that nineteen bits should be appended to each bit in the processed signal. The value of each replicated bit is based on the value of the bit being replicated. For example, one or more "1" bits are appended to each "1," and one or more "0" bits are appended to each "0." The computing device 100 appends the number of replicated bits to the first bit in the processed signal, wherein the value of the first bit is the same as the value of each of the replicated bits. This process is repeated for each bit in the processed signal.

The computing device 100 outputs 350 the processed signal to the IR system 150 via the MOSI line 172 of the data bus 170. Each bit of the processed signal is output to the IR system 150 at the bitrate of the data bus 170. Since the processed signal encodes the intended output for the IR system 150 in the time domain, the IR system 150 bitwise outputs the processed signal to the IR LED 150*a* or 150*c* on the IR system 150, such that the IR system 150 does not perform any further signal processing on the processed signal.

Figure 4:
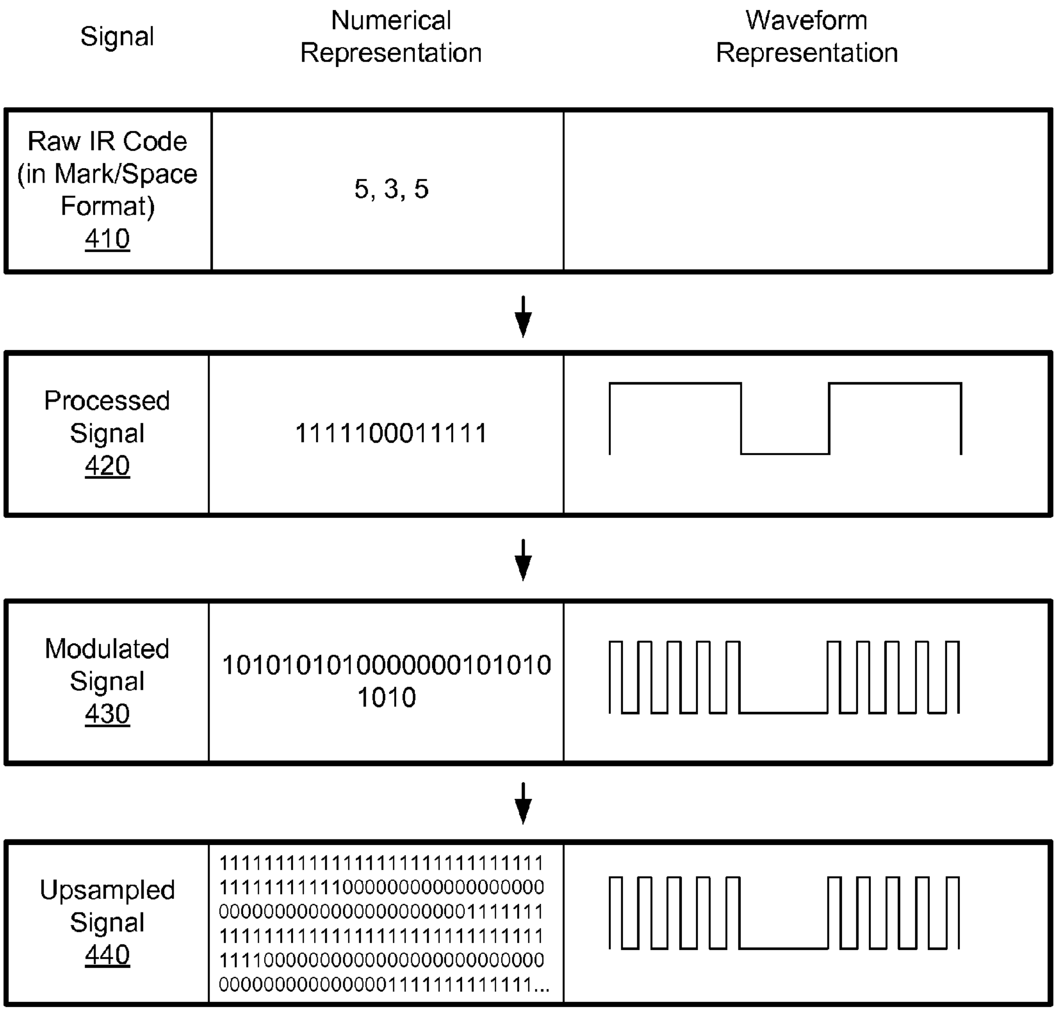
FIG. 4 illustrates a set of exemplary signals on the computing device with the fixed clock speed for generating an infrared signal.

FIG. 4 illustrates a set of example signals created by the method of FIG. 3. Each signal is illustrated numerically as a bitstream and graphically as a waveform in the time domain. Some signals may only be embodied as a bitstream or a waveform, and not both, in the method of FIG. 3. The signals in FIG. 4 do not encode actual data generated by the computing device 100 and should be considered for explanatory purposes only.

A raw IR code in mark/space format 410 is initially received 310 by the computing device 100. The raw IR code 410 indicates a series of counts, during which the IR system 150 is in an ON state or OFF state. For example, the exemplary raw IR code 410 shown in FIG. 4 indicates that the IR system 150 should be in an ON state for five counts, in an OFF state for three counts, and then in an ON state for five more counts.

The processed signal 420 is a bitstream based on the raw IR code 410, generated by step 320 of FIG. 3. The processed signal 420 is made up of five "1" bits, three "0" bits, and five "1" bits, which correspond to the elements of the raw IR code 410. The processed signal can also be represented as a digital waveform in the time domain.

The modulated signal 430 the result of step 330 in the method of FIG. 3. During modulation 330, a "0" is appended after each bit in the bitstream of the processed signal 420. Each "1" in the processed signal 420 is effectively replaced with "10," while each "0" in the processed signal 420 is replaced with "00." The modulated signal 430 can also be represented as a series of pulses, where each pulse in the waveform corresponds to a count during which the IR system 150 emits the IR signal. However, because the intended bitrate of the modulated signal is doubled during modulation, the modulated signal 430 is output over the same length of time as the processed signal 420.

The upsampled signal 440 is created by step 340 in the method of FIG. 3. Each bit in the modulated signal 430 is replicated a number of times, depending on the difference between the intended bitrate of the modulated signal 430 and the bitrate of data bus 170. In this example, nineteen replicated bits are appended to each bit in the modulated signal 430. Thus, nineteen "1" bits are appended to the first bit, which is "1," and nineteen "0" bits are appended to the second bit, which is a "0," and so on. The upsampled signal 440 is also represented as a digital waveform that appears to be the same as the waveform representation of the modulated signal 430. Even though there are more bits in the upsampled signal 440 than in the modulated signal 430, the intended bitrate of the upsampled signal 440 is the bitrate of the data bus 170. Thus, the modulated signal 430 and the upsampled signal 440 are output over the same length of time. Because the IR system 150 does no further signal processing and outputs signals bitwise in the time domain, the waveform representation of the upsampled signal 440 is also the IR signal that is output from the IR system 150.

Figure 5:
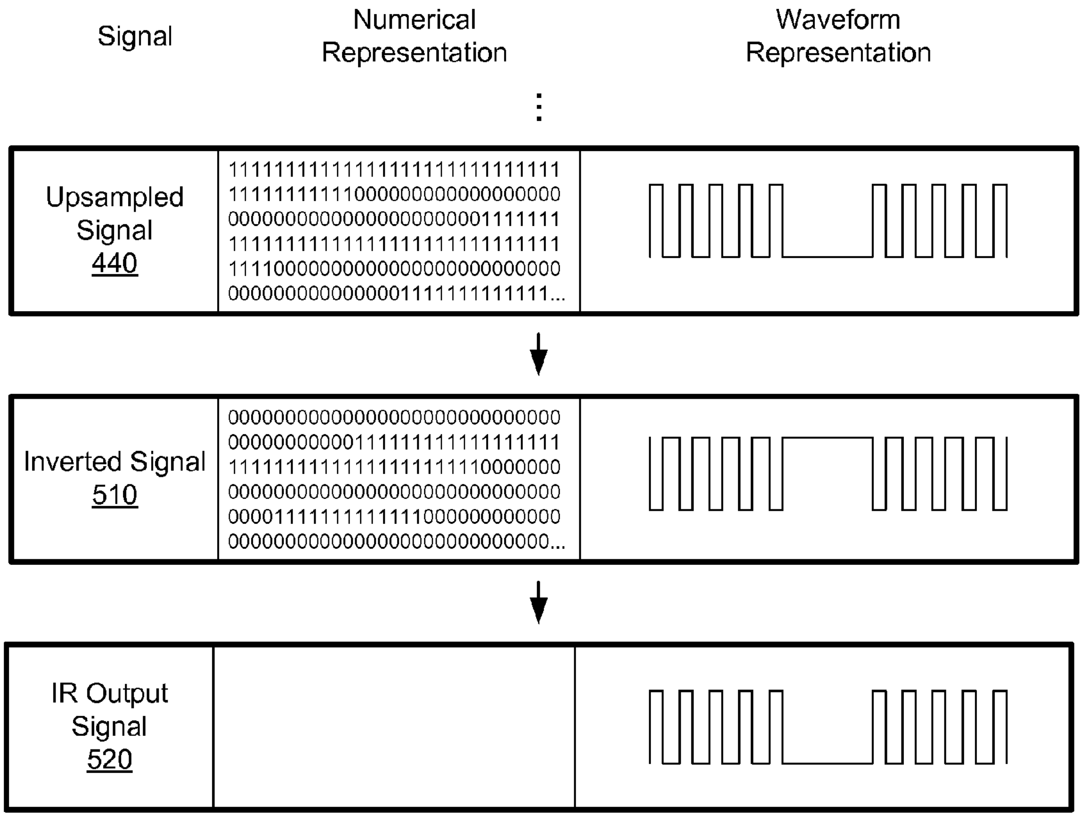
FIG. 5 illustrates a set of exemplary signals output to a default-high data bus.

FIG. 5 illustrates a set of exemplary signals on a computing device with a default-high data bus 170, created by the process of FIG. 3 with an inversion step added before outputting 350 the processed signal to the IR system 150. With a default-high data bus 170, a signal of "000" would be output as three logic highs instead of as three logic lows as in a default-low data bus 170. If the signal "000" is meant to specify that the IR system 150 is in an OFF state for three counts, but it is output to the IR system 150 via a default-high data bus 170, the IR system 150 would actually be in an ON state for three counts. To compensate, the upsampled signal 740 is inverted by the inversion module 290 before it is output to the IR system 150 over the MOSI line 172 of the data bus 170.

After inverting the processed signal 440, an inverted signal 510 is output to the default-high data bus 170. The inverted signal 510 is identical to the upsampled signal 440, except that every bit of the inverted signal 510 is in the opposite state of the corresponding bit in the upsampled signal 440. The inverted signal 510 is output to the IR system 150 on the MOSI line 172 of the default-high data bus 170. The IR system 150 then outputs an IR output signal 520 that is identical to the waveform representation of the upsampled signal 440.

The inverting process can be performed by program code executed by a processor on the computing device 100, which can allow the signal to be effectively output as a default-low signal on a default-high data bus 170 without additional hardware. Other embodiments of the computing device 100 invert the upsampled signal 740 using hardware elements, such as an inverter logic gate connected to the IR system 150 or the data bus 170. In some embodiments, the computing device 100 does not both modulate 330 and upsample 340 the processed signal 420 before inverting the processed signal.

Example Method for Receiving an Infrared Signal

Figure 6:
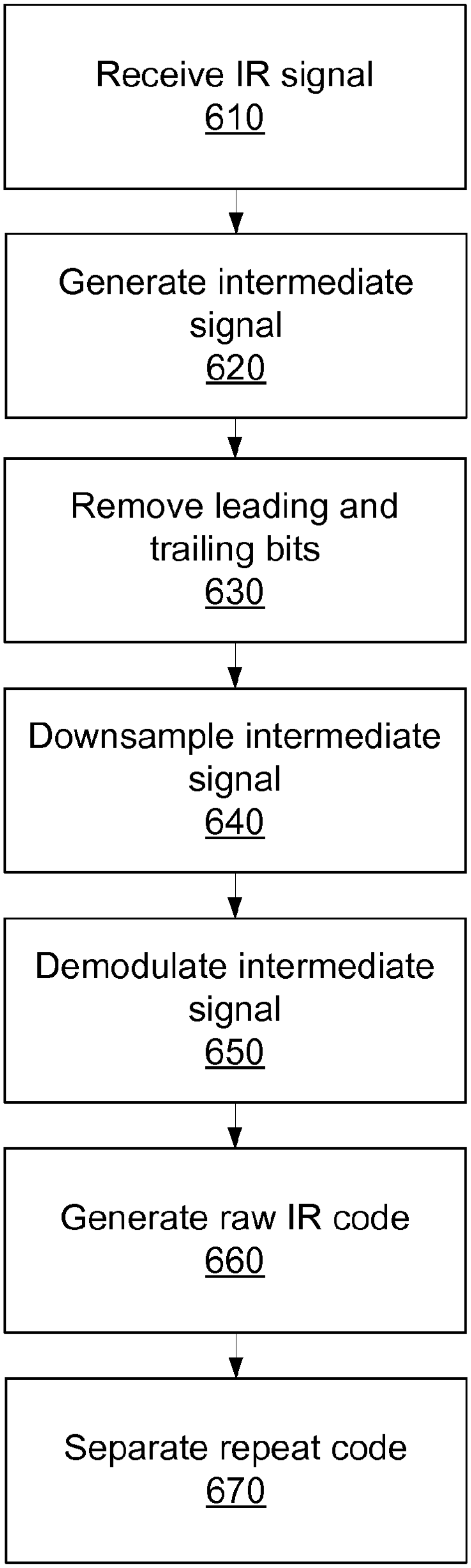
FIG. 6 illustrates a process for receiving an infrared signal on a computing device with a fixed clock speed, according to one embodiment.

FIG. 6 is a flowchart depicting a process for receiving an IR signal on a computing device 100 that has a default-low data bus 170 with a fixed clock speed, according to one embodiment. The process of FIG. 6 is enabled at least in part by software executing on the computing device 100. For example, the computing device 100 may include instructions stored to a non-transitory computer-readable storage medium that when executed by the processor 110, cause the processor 110 to perform the steps of FIG. 6 below. Additional or alternative steps may be included in other embodiments of the process of FIG. 6.

The computing device 100 receives 610 an IR signal from the IR system 150. The IR signal is typically sent from an external device 180, such as a remote control. In one embodiment, the computing device 100 records and uses the IR codes, allowing the computing device 100 to act as a remote control that emits the IR codes. In another embodiment, the computing device 100 executes instructions received through infrared signals. However, the IR signal may be received 610 from any apparent source.

To receive 610 the IR signal, the computing device 100 sends an empty bitstream, comprised entirely of logic 0's, to the IR system 150 over the MOSI line 172 of the data bus 170. Writing an empty bitstream to the MOSI line 172 triggers the data bus 170 to generate the CLK signal 176, which allows the MISO line 174 to write data. If nothing is written to the MOSI line 172, no CLK signal 176 is generated, and the MISO line 174 cannot write data. The empty bitstream may be long enough to span several seconds in the time domain, which is much longer than the time duration of the IR signal itself, in case there is a delay between when the IR system 150 receives the empty bitstream on the MOSI line 174 and when the IR signal is received 610 from the external device 180.

The computing device 100 generates 620 an intermediate signal that encodes the received IR signal with the intermediate signal generator 255. The IR system 150 samples the received IR signal at the bitrate of the data bus 170 to form a bitstream. The intermediate signal is received by the processor 110 over the MISO line 174 on the data bus 170.

Using the signal trimming module 260, the computing device 100 removes 630 leading and trailing bits from the intermediate signal. The leading and trailing bits are bits that are written by the MISO line 174 before and after the IR signal is received by the IR system 150. Thus, the leading and trailing bits do not encode the IR signal and do not affect the decoding of the IR signal when they are removed from the intermediate signal.

The leading bits are removed 630 from the intermediate signal by determining the value of the first bit in the intermediate signal. If the bit is "0," the bit is removed from the intermediate signal. This process is repeated for subsequent bits in the intermediate signal until the computing device 100 detects a "1." The first "1" bit in the intermediate signal is considered the start of the useful portion of the intermediate signal that encodes the IR signal. However, any predetermined sequence of bits may designate the start of the useful portion of the intermediate signal. Additionally, a "0" bit may indicate the start of the useful portion of the intermediate signal in some embodiments, and thus the "1" bits are removed instead of the "0" bits.

The trailing bits are removed 630 from the intermediate signal in a similar manner. The computing device 100 determines the value of the last bit in the intermediate signal. If the bit is a "0," the bit is removed from the intermediate signal. This process is repeated for the new last bit in the intermediate signal until the value of the last bit is "1." In this embodiment, the "1" bit designates the end of the useful portion of the intermediate signal. However, any predetermined sequence of bits may designate the end of the useful portion of the intermediate signal. Additionally, a "0" bit may indicate the end of the useful portion of the intermediate signal in some embodiments, and thus the "1" bits are removed instead of the "0" bits.

The computing device 100 downsamples 640 the intermediate signal to a bitrate associated with the carrier frequency of the IR signal using the downsampling module 365. This is the opposite of the upsampling step 340 from the method of FIG. 3. When the intermediate signal has a bitrate higher than the bitrate associated with carrier frequency of the IR signal, the intermediate signal needs to be downsampled by a downsampling factor to remove repetitive bits. The carrier frequency can be determined from the carrier waveform via the carrier frequency module 220. Alternatively, the carrier frequency can be determined by known communication protocols.

The downsampling factor indicates a number of bits that are removed from a plurality of repetitive bits when the intermediate signal is downsampled. If the intermediate signal is modulated, the intermediate signal needs to be downsampled such that the new intended bitrate of the intermediate signal is equivalent to twice the carrier frequency of the IR signal. Thus, the downsampling factor may be one less than the quotient of the bitrate of the intermediate signal and a bitrate equivalent to twice the carrier frequency. For example, if the bitrate of the intermediate signal is 1.5 Mbit/s and the carrier frequency is 38 kbit/s, the downsampling factor is nineteen. If the intermediate signal is not modulated, the intermediate signal needs to be downsampled such that the new intended bitrate of the intermediate signal is equivalent to the carrier frequency of the IR signal. Thus, the downsampling factor may be one less than the quotient of the bitrate of the intermediate signal and a bitrate equivalent to the carrier frequency. In another embodiment, the computing device 100 uses statistical processing or a machine learning algorithm to determine the downsampling factor.

The computing device 100 demodulates 650 the intermediate signal with the signal demodulator 270. This is the opposite of the modulating step 330 in the method of FIG. 3. In one embodiment, each instance of "10" in the intermediate signal is replaced with a "1," while each instance of "00" in the intermediate signal is replaced with a "0." The intended bitrate of the intermediate signal is also halved to prevent the intermediate signal from being compressed in the time domain. For example, an intermediate signal "1010000010" that has an intended bitrate of 76 kbit/s would be "11001" with an intended bitrate of 38 kbit/s after demodulation. In another embodiment, the computing device 100 removes alternating bits from the signal. For example, the computing device 100 may remove all bits at odd indices in the intermediate signal. If the computing device 100 received 910 an unmodulated IR signal, the computing device 100 skips the demodulation 650 step altogether. Additionally, the intermediate signal may not be demodulated 650 if the IR code generated in step 660 is supposed to include modulation.

The computing device 100 uses the IR code generator 275 to generate 660 an IR code based on the intermediate signal, which is the reverse of step 320 of the method of FIG. 3. The computing device 100 generates a number in the IR code for each plurality of similar bits in the intermediate signal. The value and position of the number are determined by the corresponding plurality of similar bits in the intermediate signal. The value of the number is determined by number of bits in the plurality of bits, while the position of the number in the IR code is determined by the value of the plurality of bits and where the plurality of bits falls in the intermediate signal. In one embodiment, every string of consecutive "1" bits in the intermediate signal is converted into a number at an odd index of the IR code, and every string of consecutive "0" bits in the intermediate signal is converted into a number at an even index of the IR code. For example, the intermediate signal "100001110000" generates the IR code "1, 4, 3, 4." In some embodiments, the intermediate signal is demodulated 650 before generating the IR code, while in other embodiments, the intermediate signal may not be demodulated 650.

The computing device 100 separates 670 repeated code in the IR code with the repeat code module 280. The IR signal may contain repeated instances of the IR code, so duplicates of the IR code may need to be separated 670. This may be accomplished using a duplicate detection formula, a statistical formula, a hash table, an algorithm, or any other method familiar to a person who has ordinary skill in the art. In some embodiments, the repeat code is also stored in a database.

Figure 7:
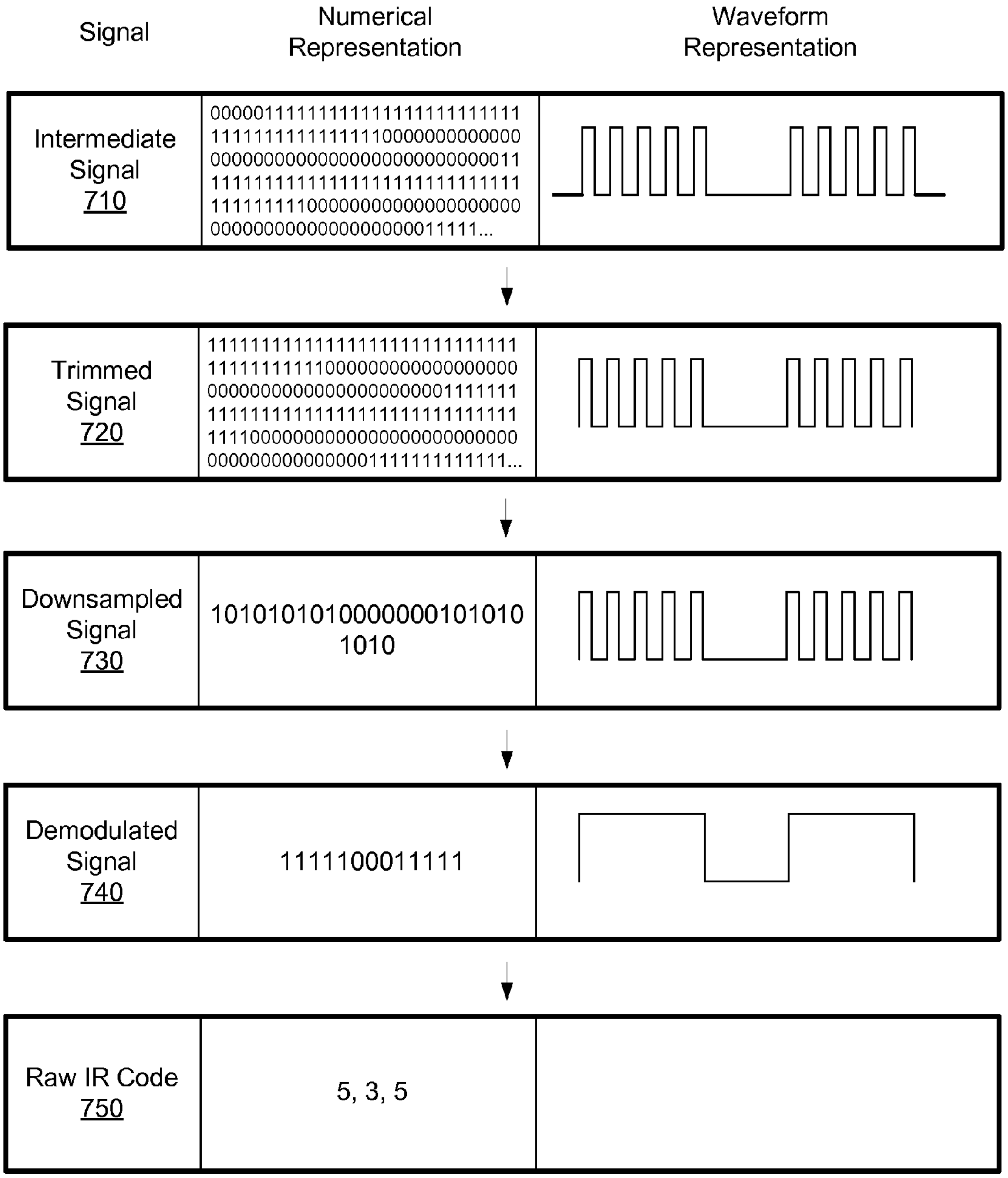
FIG. 7 illustrates a set of exemplary signals on the computing device for receiving an infrared signal.

FIG. 7 illustrates a set of example signals created by the method of FIG. 6 without step 670. Each signal is illustrated numerically as a bitstream and graphically as a waveform in the time domain. Some signals may only be embodied as a bitstream or a waveform, and not both, in the method of FIG. 6. The signals in FIG. 7 do not encode actual data generated by the computing device 100 and should be considered for explanatory purposes only.

The intermediate signal 710 is generated after the IR system 150 receives 610 the IR signal in step 620 of the method of FIG. 6. The intermediate signal 710 encodes the raw IR code 750, which is "5, 3, 5," because the IR signal is received for five counts, not received for three counts, and received for five additional counts. This is apparent from the waveform representation of the intermediate signal 710. However, the intermediate signal 610 also includes several leading bits, represented by five "0" bits. The number of bits corresponds to the time from when the computing device 100 starts sending the empty bitstream to the IR system 150 and when the IR system 150 starts receiving 610 the IR signal.

The trimmed signal 720 is identical to the intermediate signal 710, sans the leading and trailing bits. The trimmed signal still encodes the same raw IR code as the intermediate signal 710, as shown in the waveform representations. The trimmed signal 720 results from step 630 in the method of FIG. 6.

The downsampled signal 730 is a downsampled bitstream based on the trimmed signal 720 and results from step 640 of the method of FIG. 6. Bits are removed from the trimmed signal 720 based on a downsampling factor. In this example, the downsampling factor is nineteen, so nineteen bits are removed from each string of consecutive "1" bits or consecutive "0" bits. However, the waveform representation of the downsampled signal 730 matches the waveform representation of the trimmed signal 720.

The demodulated signal 740 is a demodulated bitstream based on the downsampled signal 730. The demodulation step 650 effectively replaces each instance of "10" with a "1" bit, and each instance of "00" with a "0" bit. The waveform representation of the demodulated signal 740 shows the long pulses that last the same number of counts as there are pulses in the waveform representation of the downsampled signal 730.

The demodulated signal 740 is converted into the raw IR code 750, as a result of step 660 of the method of FIG. 6. Each string of unbroken "1" bits is converted into a number in an odd index of the raw IR code 750. For example, the leading string of "1" bits in the demodulated signal 740 is converted into a "5" located at the first index of the raw IR code 750. Each string of unbroken "0" bits is converted into a number at an even index in the raw IR code. Thus, the string of three "0" bits is converted into a "3" at the second index of the raw IR code 750.

In some embodiments, the data bus 170 is default-high instead of default-low and requires inverting the intermediate signal at some point to get the correct IR code. Similar to the example in FIG. 5, the system can compensate by inverting the intermediate signal with the inversion module 290 before it is turned into an IR code.

Compensating for Discontinuous Clock Signals

Figure 8A:
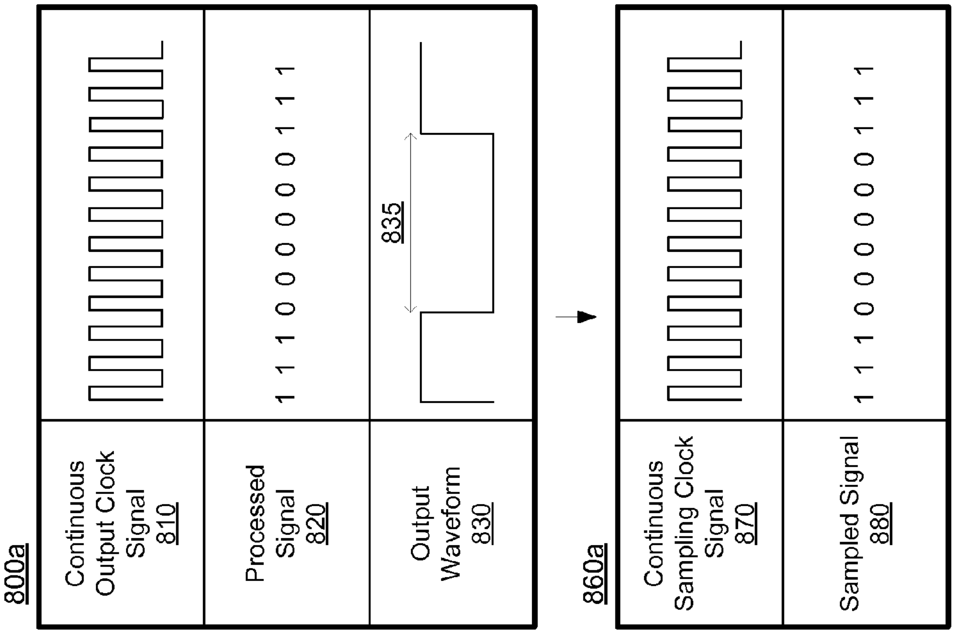
FIG. 8A illustrates a signal that is output and sampled at a clock signal that has no delays, according to one embodiment.
Figure 8B:
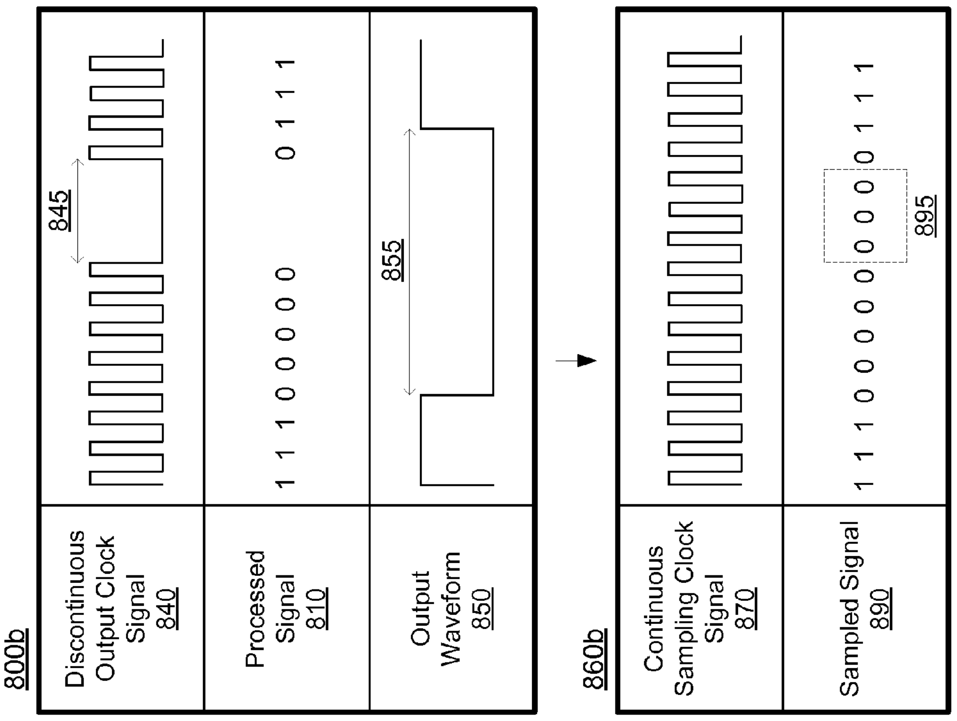
FIG. 8B illustrates a signal that is output at a clock signal with delays and sampled at a clock signal with no delays, according to one embodiment.

FIGS. 8A and 8B show the differences between a signal output by a continuous clock signal and a signal output by a discontinuous clock signal. FIG. 8A illustrates a generation unit 800*a* with a continuous output clock signal 810, and a receiving unit 860*a* with a continuous sampling clock signal 870. At the generation unit 800*a*, the processed signal 820 is output by a continuous output clock signal 810 to produce the output waveform 830. The output waveform 830 can be transmitted to the receiving unit 860*a*, where it is sampled by the continuous sampling clock signal 870 to produce the sampled signal 880. Because the output clock signal 810 is continuous, and the sampling clock signal 870 is also continuous, the sampled signal 880 matches the original processed signal 820.

FIG. 8B illustrates the same processed signal 810 output by a discontinuous output clock signal 840 to produce the output waveform 850 at the generation unit 800*b*. Due to a break 855 in the discontinuous output clock signal 840, the output waveform 850 is longer than the output waveform 830. In particular, the length of the zero period 835 in the output waveform 830 has been lengthened when compared to the zero period 855 in the output waveform 850. When the output waveform 850 is transmitted to the receiving unit 860*b* that samples it according to the continuous sampling clock signal 870, the resulting signal is a sampled signal 890, which includes extra zeroes 895 compared to the original processed signal 810.

Figure 9B:
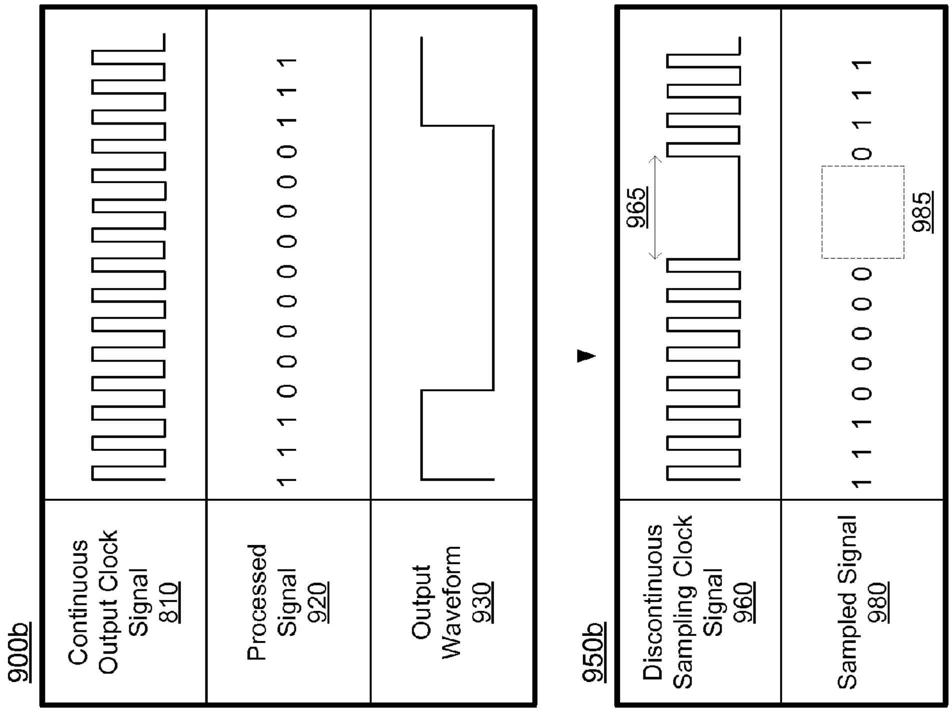
FIG. 9B illustrates a signal that is output at a clock signal with no delays and sampled at a clock signal with delays, according to one embodiment.
Figure 9A:
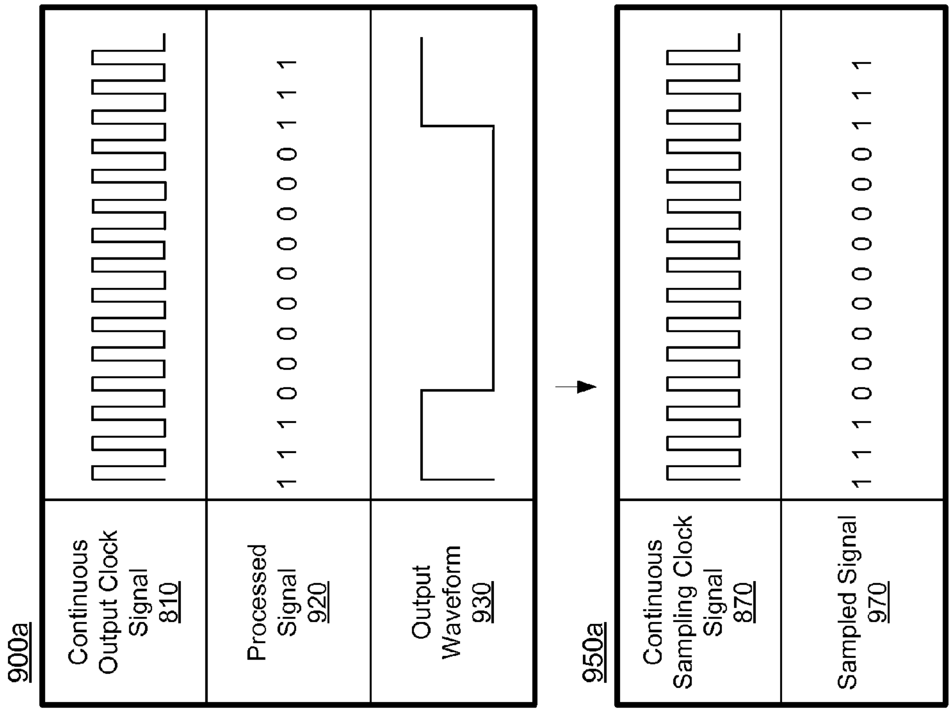
FIG. 9A illustrates a signal that is output and sampled at a clock signal that has no delays, according to one embodiment.

FIGS. 9A and 9B show the differences between a signal sampled by a continuous clock signal and a signal sampled by a discontinuous clock signal. FIG. 9A illustrates a generation unit 900*a* with a continuous output clock signal 910, and a receiving unit 960*a* with a continuous sampling clock signal 970. At the generation unit 900*a*, the processed signal 920 is output by a continuous output clock signal 810 to produce the output waveform 930. The output waveform 930 can then transmitted to the receiving unit 950*a*, where it is sampled by the continuous sampling clock signal 870 to produce the sampled signal 970. As in FIG. 8A, because the output clock signal 810 is continuous, and the sampling clock signal 870 is also continuous, the sampled signal 970 matches the original processed signal 920.

FIG. 9B illustrates the same processed signal 910 output by the same continuous output clock signal 810 to produce the same output waveform 930 at the generation unit 900*b*. However, when the output waveform 930 is transmitted to the receiving unit 950*b*, it is sampled by the discontinuous sampling clock signal 960 that has a break 965. The resulting sampled signal 980 has extra zero bits 995 compared to the original processed signal 920, which corresponds to the output waveform 930 not being sampled during the break 965 in the discontinuous sampling clock signal 960.

Thus, FIGS. 8A, 8B, 9A, and 9B show that breaks in the clock signal can result in the signal that is received differing from the signal that was intended to be transmitted. In some embodiments, generation units 800*a*, 800*b*, 900*a* and 900*b* may be on separate computing devices from receiving units 860*a*, 860*b*, 950*a*, and 950*b*. Additionally, breaks in the clock can lengthen the output signal and shorten the input signal in general. To output and receive the correct IR signals in the time domain, the breaks in the clock must be compensated for.

One method of compensating for a discontinuous clock signal is to calculate the effect of the clock breaks on the overall speed of the clock signal and determine an effective bitrate of the data bus 170, which is done by the effective bitrate module 285.

To generate the effective bitrate, the effective bitrate module 285 determines the duration of each break in the clock signal. Generally, the breaks are of consistent length, so measuring a single break is sufficient. An arbitrary period significantly longer than the period of the clock signal is chosen and the number of breaks during the arbitrary period is counted. The total time lost to clock breaks can be determined by multiplying the number of breaks by the duration of the break. The total time lost due to the clock breaks can be translated to a reduction in the number of bits output by the data bus 170 by multiplying the nominal bitrate by the total time lost to clock breaks. The effective bitrate can then be calculated by dividing the number of bits actually output by the data bus 170 during the arbitrary period.

For example, the clock speed might be nominally set at 1.5 MHz, which results in a nominal bitrate of 1.5 Mbit/s. An arbitrary period of 1 second is chosen, and it is determined that there are 16750 breaks with a duration of 4 μs each over that period. Thus, 100 kbits of 1.5 Mbits that should have been output over 1 second according to the nominal bitrate are not actually output due to the breaks, which results in an effective bitrate of 1.4 Mbit/s. Knowing the effective bitrate of the data bus 170, the output and input signals can be processed according to the effective bitrate instead of the nominal bitrate. This compensation prevents the time-domain effects on signals demonstrated in FIGS. 8A, 8B, 9A, and 9B.

An exemplary signal that is to be output is upsampled from 14 bits to 210 bits so that it can be output over 140 μs at the nominal bitrate of 1.5 Mbit/s. However, due to the clock breaks, the signal is actually output at an effective bitrate of 1.4 Mbit/s, which would lengthen the output signal to about 150 μs if unaccounted for. By using the effective bitrate in place of the nominal bitrate when sampling, the signal is instead upsampled to 196 bits so that it can still be output over about 140 μs at the effective bitrate of 1.4 Mbit/s.

An exemplary signal that is received is 280 μs long and assumed to be sampled at the nominal bitrate of 1.5 Mbit/s, which is also the intended bitrate associated with the resulting intermediate signal. However, due to the breaks in the clock signal, the intermediate signal is only 392 bits long. If the signal were actually sampled at the nominal bitrate of 1.5 Mbits/s, the intermediate signal would have been 420 bits long. Thus, 28 bits are missing from the intermediate signal. This means that if the intermediate signal were output at an actual bitrate of 1.5 Mbit/s, by a clock signal with no breaks, the signal would only be about 261 μs long instead of 280 μs long. This can be avoided by using the effective bitrate in place of the nominal bitrate, like setting the intended bitrate associated with the intermediate signal to the effective bitrate of 1.4 Mbit/s instead of the nominal bitrate of 1.5 Mbit/s.

Figure 10:
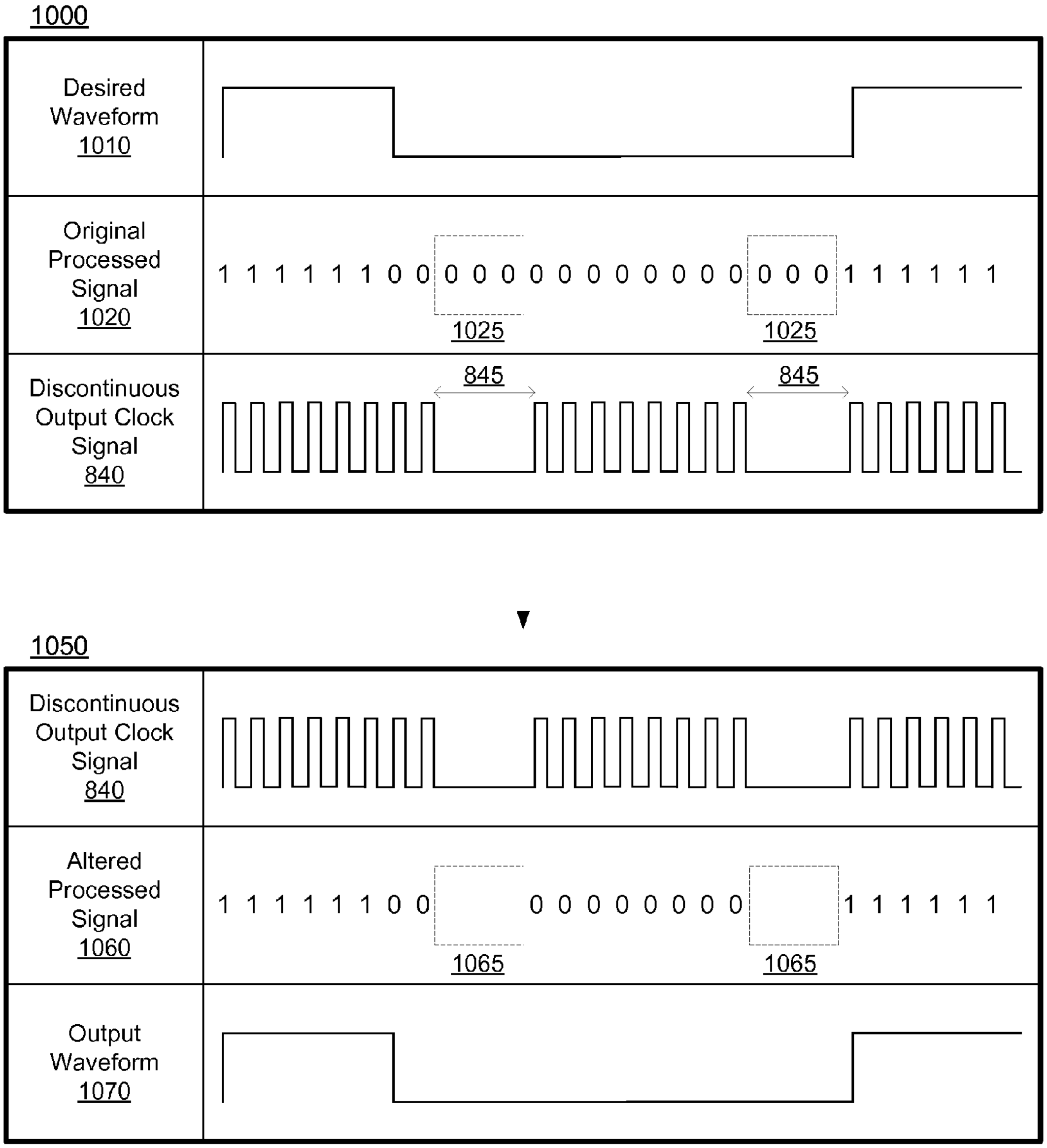
FIG. 10 illustrates an example of a signal that has been adjusted to compensate for delays in the output clock signal, according to one embodiment.

FIG. 10 illustrates another method of compensating for the clock breaks in a clock signal that is discontinuous when outputting a signal. For comparison, FIG. 10 shows the same processed signal before 1000 and after 1050 compensating for the clock breaks. In this method, the desired waveform 1010 can be produced by the original processed signal 1020 that is output by a discontinuous clock 840 by removing the bits 1025 that fall within the break 845 of the discontinuous clock signal 840. In this example, the clock breaks 845 are of a consistent length, and there are three bits 1025 that are removed from the original processed signal 1020 to create the altered processed signal 1060. In the altered processed signal 1060, no bits 1065 are output during the clock breaks 845, so the output waveform 1070 matches the desired waveform 1010.

In a more complex situation, a transition from a "1" to a "0," or from a "0" to a "1," of the desired waveform 1010 may occur during the clock break 845. In this scenario, the compensation method described above can be modified to move the transition to the previous or next clock edge and subsequent bits will be removed. Though this technique results in the output waveform 1070 being slightly different from the desired waveform 1010, that difference is usually acceptable because generally in this application, the clock frequency that is outputting the data is much higher than the clock signal of the device that is receiving and sampling the data. For example, an SPI bus can have a clock frequency of 1.5 MHz, while a common IR protocol has a carrier frequency of 38 kHz.

Additional Configuration Considerations

The disclosed example embodiments beneficially allow for sending and receiving signals on a mobile device to control an electronic device. e.g., a television, set top box, or an internet enabled, such as a home appliance. A conventional computing device 100 with infrared signal processing hardware may be able to generate and receive infrared signals. However, additional hardware increases the cost of manufacturing mobile devices and increases power consumption within the mobile device. By using software to process generated and received infrared signals, the mobile device 100 may process infrared signals without additional hardware. Furthermore, upsampling the processed signal or adjusting the clock speed before sending the processed signal to the IR system 150 allows the IR system 150 to transmit the processed signal at the bitrate of the data bus 170 without compressing the signal in the time domain. Thus, the IR system 150 does not need to further modify or transform the processed signal before outputting an IR signal. Additionally, this method can be adapted to non-traditional data buses, like those with a default-high signal instead of a default-low signal, and those with clock signals that are discontinuous.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 110, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors 110 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors 110, not only residing within a single machine, but deployed across a number of machines. In some example embodiments, the one or more processors 110 or processor-implemented modules may be located in a single geographic location (e.g., within a home environment, an office environment, or a server farm). In other example embodiments, the one or more processors 110 or processor-implemented modules may be distributed across a number of geographic locations.

Some portions of this specification are presented in terms of algorithms or symbolic representations of operations on data stored as bits or binary digital signals within a machine memory (e.g., a computer memory 120). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories 120 (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating and receiving infrared signals on a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of processing signals on a computing device comprising:

generating a clock signal on a data bus connecting a processor to an infrared system, the clock signal connected to the processor but disconnected from the infrared system, the clock signal being discontinuous and comprising a plurality of repeating units, each repeating unit having a number of equally spaced clock transitions followed by a break, the data bus having a nominal operating frequency based on the number of equally spaced clock transitions in the clock signal, the nominal operating frequency resulting in a nominal bitrate of the data bus;

determining a duration of the break in the clock signal;

determining an effective bitrate of the data bus based on the nominal operating frequency and the duration of the break in the clock signal; and processing signals using the effective bitrate.

2. The method of claim 1, further comprising generating an infrared signal in the time domain.

3. The method of claim 2, further comprising:

receiving an infrared code and a carrier frequency at which the infrared code should be output; and generating a processed signal comprising a plurality of bits based on the infrared code, wherein generating an infrared signal in the time domain comprises transferring the processed signal from the processor to the infrared system over the data bus.

4. The method of claim 3, further comprising modulating the processed signal according to the carrier frequency.

5. The method of claim 4, further comprising upsampling the processed signal based on the effective bitrate and the carrier frequency.

6. The method of claim 1, further comprising:

receiving an infrared signal at the infrared system; and generating an infrared code based on the infrared signal.

7. The method of claim 6, wherein generating an infrared code based on the infrared signal comprises:

generating an intermediate signal on the processor by sampling the infrared signal at an effective operating frequency corresponding to the effective bitrate of the data bus; and determining a carrier frequency of the infrared signal based on an analysis of a waveform of the infrared signal.

8. The method of claim 7, further comprising downsampling the intermediate signal in the time domain based on the effective bitrate and the carrier frequency.

9. The method of claim 8, further comprising demodulating the intermediate signal in the time domain.

10. The method of claim 1, wherein the data bus is a serial peripheral interface (SPI) bus.

11. A computer program product comprising a non-transitory computer readable storage medium configured to store instructions, the instructions executable to cause a processor to:

generate a clock signal on a data bus connecting the processor to an infrared system, the clock signal connected to the processor but disconnected from the infrared system, the clock signal being discontinuous and comprising a plurality of repeating units, each repeating unit having a number of equally spaced clock transitions followed by a break, the data bus having a nominal operating frequency based on the number of equally spaced clock transitions in the clock signal, the nominal operating frequency resulting in a nominal bitrate of the data bus;

determine a duration of the break in the clock signal;

determine an effective bitrate of the data bus based on the nominal operating frequency and the duration of the break in the clock signal; and process signals using the effective bitrate.

12. The computer program product of claim 11, further comprising instructions that cause the processor to generate an infrared signal in the time domain.

13. The computer program product of claim 12, further comprising instructions that cause the processor to:

receive an infrared code and a carrier frequency at which the infrared code should be output; and generate a processed signal comprising a plurality of bits based on the infrared code, wherein the instruction to generate an infrared signal in the time domain comprises transferring the processed signal from the processor to the infrared system over the data bus.

14. The computer program product of claim 13 further comprising instructions that cause the processor to modulate the processed signal according to the carrier frequency.

15. The computer program product of claim 14, further comprising instructions that cause the processor to upsample the processed signal based on the effective bitrate and the carrier frequency.

16. The computer program product of claim 11, further comprising instructions that cause the processor to:

receive an infrared signal at the infrared system; and generate an infrared code based on the infrared signal.

17. The computer program product of claim 16, wherein the instructions to generate an infrared code based on the infrared signal comprise instructions that cause the processor to:

generate an intermediate signal on the processor by sampling the infrared signal at an effective operating frequency corresponding to the effective bitrate of the data bus; and determine a carrier frequency of the infrared signal based on an analysis of a waveform of the infrared signal.

18. The computer program product of claim 17, further comprising instructions that cause the processor to downsample the intermediate signal in the time domain based on the effective bitrate and the carrier frequency.

19. The computer program product of claim 11, further comprising instructions that cause the processor to demodulate the intermediate signal in the time domain.

20. The computer program product of claim 11, wherein the data bus is a serial peripheral interface (SPI) bus.

21. A system comprising:

a processor; and a data bus having a nominal operating frequency based on a clock signal, the clock signal being discontinuous and comprising a plurality of repeating units, each repeating unit having a number of equally spaced clock transitions followed by a break, the data bus having a nominal operating frequency based on the number of equally spaced clock transitions in the clock signal, the processor configured to:

determining a duration of the break in the clock signal;

determining an effective bitrate of the data bus based on the nominal operating frequency and the duration of the break in the clock signal; and processing signals using the effective bitrate.

22. The system of claim 21, wherein the processor is further configured to generate an infrared signal in the time domain.

23. The system of claim 22, wherein the processor is further configured to:

receive an infrared code and a carrier frequency at which the infrared code should be output; and generate a processed signal comprising a plurality of bits based on the infrared code, wherein generating an infrared signal in the time domain comprises transferring the processed signal from the processor to the infrared system over the data bus.

24. The system of claim 23, wherein the processor is further configured to modulate the processed signal according to the carrier frequency.

25. The system of claim 24, wherein the processor is further configured to upsample the processed signal based on the effective bitrate and the carrier frequency.

26. The system of claim 21, wherein the processor is further configured to:

receive an infrared signal at the infrared system; and generate an infrared code based on the infrared signal.

27. The system of claim 26, wherein generating an infrared code based on the infrared signal comprises:

generating an intermediate signal on the processor by sampling the infrared signal at an effective operating frequency corresponding to the effective bitrate of the data bus; and determining a carrier frequency of the infrared signal based on an analysis of a waveform of the infrared signal.

28. The system of claim 27, wherein the processor is further configured to downsample the intermediate signal in the time domain based on the effective bitrate and the carrier frequency.

29. The system of claim 21, wherein the processor is further configured to demodulate the intermediate signal in the time domain.

30. The system of claim 21, wherein the data bus is a serial peripheral interface (SPI) bus.

* * * * *